(12) United States Patent
Lingenheil et al.

(10) Patent No.: US 12,114,798 B2
(45) Date of Patent: Oct. 15, 2024

(54) COOKING APPLIANCE

(71) Applicant: RATIONAL Wittenheim SAS, Wittenheim (FR)

(72) Inventors: Markus Lingenheil, Wittenheim (FR); Mathieu Mougey, Wittenheim (FR); Reinhard Wassmus, Wittenheim (FR)

(73) Assignee: RATIONAL WITTENHEIM SAS (FR)

( * ) Notice: Subject to any disclaimer, the term of this patent is extended or adjusted under 35 U.S.C. 154(b) by 1011 days.

(21) Appl. No.: 17/019,005

(22) Filed: Sep. 11, 2020

(65) Prior Publication Data

US 2021/0068577 A1 Mar. 11, 2021

(30) Foreign Application Priority Data

Sep. 11, 2019 (DE) ...................... 10 2019 124 461.7

(51) Int. Cl.
*A47J 27/08* (2006.01)
*A47J 27/092* (2006.01)

(52) U.S. Cl.
CPC ......... *A47J 27/0804* (2013.01); *A47J 27/092* (2013.01)

(58) Field of Classification Search
CPC ...... A47J 27/092; A47J 27/92; A47J 27/0806; A47J 27/0808; A47J 27/0815; A47J 27/0811; A47J 27/0804

USPC .................................................. 220/315, 316
See application file for complete search history.

(56) References Cited

U.S. PATENT DOCUMENTS

| | | | |
|---|---|---|---|
| 6,425,320 B1 * | 7/2002 | Chameroy | A47J 27/092 220/573.1 |
| 2007/0028780 A1 | 2/2007 | Popeil et al. | A47J 37/12 |
| 2015/0327724 A1 | 11/2015 | Jo et al. | A47J 37/129 |
| 2019/0274462 A1 * | 9/2019 | Moon | A47J 27/086 |

FOREIGN PATENT DOCUMENTS

| | | | |
|---|---|---|---|
| DE | 102017115556 | 1/2019 | A47J 27/14 |
| FR | 2683987 | 5/1993 | A47J 36/10 |
| JP | H07298986 | 11/1995 | A47J 36/10 |
| JP | 2007285546 | 1/2007 | F24C 1/00 |
| KR | 101343685 | 12/2013 | A47J 27/00 |

* cited by examiner

*Primary Examiner* — Jeffrey R Allen
(74) *Attorney, Agent, or Firm* — HAYES SOLOWAY P.C.

(57) ABSTRACT

A cooking appliance having a pan and a movable lid closing a cooking chamber in the pan has a locking element which is movable by motor and is either integrated in the pan or integrated in the lid. When the pan is in its closed state, the locking element, when in its locking position, protrudes either from the top side of the pan or the lower side of the lid and extends into the respective other part to mechanically lock it.

20 Claims, 6 Drawing Sheets

COOKING APPLIANCE

FIELD OF THE INVENTION

The invention relates to a cooking appliance having at least one pan and a movable lid closing a cooking chamber in the pan, the pan having a top side against which the lower side of the lid can sealingly rest when the cooking appliance is in its closed state.

BACKGROUND

Cooking appliances with a swivel-mounted pan are also referred to as tippers; they are all-round appliances in which food can be heated, cooked, fried or deep-fried, for example. The pans are usually tilted forward towards the operator in order to empty the pan. The cooking chamber is optionally closed by a hinged lid, with a seal usually being provided between the pan and the lid, so that an overpressure can prevail in the cooking chamber to allow a so-called pressure cooking. The pressures inside the cooking chamber may be high; therefore, it is first made sure that the pressure within the cooking chamber has been lowered to near ambient pressure before the pan is opened, i.e. before the lid is unlocked and swiveled to its open position. Higher cooking pressures are advantageous in order to save energy during the cooking process and to allow the cooking process to be completed more quickly.

The invention below applies both to cooking appliances having one or more non-tiltable pans and also to those having tiltable pans.

The object of the invention is to improve a generic cooking appliance such that the cooking appliance is tight at higher pressures and so as to allow very easy cleaning without any disturbing contours.

SUMMARY

The present invention provides a cooking appliance having at least one pan and a movable lid closing a cooking chamber in the pan, the pan having a top side against which the lower side of the lid can sealingly rest when the cooking appliance is in its closed state. At least one locking element is provided which is movable by motor and is either integrated in the pan or integrated in the lid. When the pan is in its closed state, i.e. with the lid swung down, this at least one locking element, when in its locking position, extends from the top side and vertically upwards relative to the top side. The locking element mechanically locks the lid and the pan to each other to prevent opening.

In the cooking appliance according to the invention, the locking element, movable by motor, extends in an integrated manner between the top side of the pan and the lower side of the lid in order to form a bridge between the two parts, rather than making provision for a mechanical locking device, which is usually located on the outside, in the rear area of the pan and the lid, near the swivel axis for swiveling the lid, and/or on the front side or on the two sides on the left and right of the lid and pan, to prevent movement of the lid. Due to the integration in the pan or in the lid, the locking element is always available, but not in the way. It is not a separate clamp that acts on the outside of the lid and the pan, or a locking device with locking bolts and locking bolt receiving geometries, such as, e.g., eyelets or ears that are each attached to or constructed on the pan or on the lid. Such solutions would, in fact, be permanently in the way, at least on one side, and appear or are disturbing and constitute contours that are difficult to clean.

In particular, in a locking element integrated in the pan, the locking element integrated in the pan, when in its locking position, extends into the lid. In a locking element integrated in the lid, the locking element integrated in the lid, when in its locking position, extends into the pan. In this way, the lid or the pan can be grasped in its interior and locked thereby.

The locking element may, driven by motor, execute an axial movement in order to penetrate into the lid for locking in the case of a locking element integrated in the pan and to penetrate into the pan in the case of a locking element integrated in the lid. In addition to the axial movement, a swivel movement can, of course, also be executed, that is, the two movements can be performed one after the other in time or as a combined movement. The axial movement allows the locking element to be moved back into the lid or into the pan or to be extended further out of the respective part in order to actively move into the respective other part and to provide for the locking action there. Even in the locked state, no parts of the locking device protrude outwards which would be a hindrance to the user.

At least one sensor device may be provided which is configured to detect a relative position of the lid in relation to the pan and/or a position of the locking element. In this way it can be detected whether the lid is in a closed state and can be locked by the locking element and whether the locking element is in a completely extended and rotated or in a completely retracted state.

In particular, the detection is effected capacitively, mechanically, magnetically, optically, electrically and/or resistively.

To this end, the sensor device may include a sensor which is integrated in the lid or in the pan, for example, and/or a release which, for example, is integrated in the other of the lid or pan in which the sensor is not integrated.

For example, the sensor is a Hall-effect sensor, a Reed sensor or a mechanical switch, and the release is magnetic, ferromagnetic or a tappet.

According to one variant of the invention, the at least one locking element that is either integrated in the pan or integrated in the lid can execute a swivel movement in order to engage behind a counterpart on the lid in the case of a locking element integrated in the pan or a counterpart on the pan in the case of a locking element integrated in the lid. This engagement behind a counterpart secures the mechanical locking against a swivel movement of the lid and/or the pan.

The at least one locking element may include at least one laterally projecting locking extension by which it engages behind the counterpart.

This counterpart is, for example, a lid wall facing the top side, or the pan front wall which forms the top side of the pan.

In the locking element integrated in the pan, the lid has, on its lid wall facing the top side, at least one passage opening through which the associated locking element can penetrate into the interior of the lid during locking. Conversely, in a locking element integrated in the lid, the pan has, on its top side, at least one passage opening through which the associated locking element penetrates into the interior of the pan during locking.

In order to ensure functional reliability over years and to prevent liquid or steam, in particular steam containing fat, from entering the pan or the lid through the respective passage opening, a spring-loaded cover is provided for the at least one passage opening. This cover can be displaced by the associated locking element penetrating into the passage opening. In the opened, i.e. unlocked state, however, the passage opening is closed by the cover. Preferably, the cover is even flush with the lower side of the lid in the case of a locking element integrated in the pan and flush with the top side of the pan, i.e. the pan front wall, in the case of a locking element integrated in the lid, and with the cooking appliance open. In this way, the appliance can be cleaned very easily and completely, there is no protruding part and no passage opening is open.

The locking element may, for example, have a T-shaped head which lockingly engages the lid or the pan. In particular when the passage opening is provided in the form of a keyhole-type opening, the locking element can be passed through the oblong passage opening by its T-shaped head and then be rotated by, for example, ninety degrees.

In order not to allow any protruding sections with respect to the locking element when the lid is in the open state, the locking element, if it is integrated in the pan, may in the retracted condition be flush with the top side of the pan. The top side has a receiving opening through which the locking element extends in the extended position. When the locking element is in the retracted position, however, it is preferably flush with the top side, in particular so as to be flat or at a very small angle relative to the sides that are flush. The same provision is made for a locking element that is integrated in the lid and is flush with the lower side of the lid, then closing a receiving opening on the lower side of the lid. In its retracted state, the locking element is thus hygienically completely embedded in the top side of the pan or in the lower side of the lid. The transitions to the outside of the pan and the lid have no steps or shoulders; there are no protruding parts either. This increases hygiene and allows easy cleaning.

To ensure the tightness in the area of the receiving opening when the locking element is in the retracted condition, a variant of the invention here provides that between the opening edge defining the receiving opening and the peripheral edge of the locking element in the retracted condition of the locking element, a seal closes a gap between the opening edge and the peripheral edge. This seal may be made from plastic, for example. The seal precludes liquid or cleaning fluid from reaching the interior of the pan or the lid through the receiving opening when the cooking appliance is in the unlocked and open state.

If it is intended to save on electrical drives, a singular drive for actuating the at least one locking element can be coupled to a mechanical guide means, from the movement of which a vertical adjustment and additionally a rotation of the at least one locking element is derived from the drive. This means that the same drive leads to a vertical adjustment and additionally to the turning of the locking element into and out of the locking position.

To determine the position of the locking element, the position of the drive and/or of the guide means can be detected by the sensor device.

Alternatively or additionally, the position of the locking element may be detected directly by the sensor device, i.e. the sensor directly measures the position of the locking element.

The pan of the cooking appliance according to the invention may include an outlet valve near the bottom for emptying the pan. This outlet valve is, for example, mechanically coupled to the drive of the at least one locking element integrated in the pan. The drive thus also actuates the outlet valve and therefore has a plurality of functions.

Preferably, a mechanical coupling of the drive to the outlet valve is configured such that the outlet valve can be opened only when the lid is in the unlocked state. If several drives were provided for this purpose, which actuate the outlet valve, on the one hand, and the locking elements, on the other hand, an electrical fuse protection would be necessary at any rate, which prevents the valve drive from being actuated when the lid is locked, thus making pressure operation impossible.

The above-mentioned mechanical coupling may comprise a longitudinally adjustable drive member which is coupled to the drive. This drive member is shifted in a locking travel and thereby shifts the at least one locking element. A travel exceeding the locking travel will only then actuate the outlet valve, so that the total travel of the drive member is divided into a plurality of sectors.

In one embodiment, a controller is provided which is coupled to the sensor device and the drive by way of information technology, the controller being adapted to actuate the drive for shifting the at least one locking element only when the sensor device has detected that the lid, in the case of a locking element integrated in the pan, or the pan, in the case of a locking element integrated in the lid, can be mechanically grasped by the locking element, i.e. that an interlocking fit is feasible for locking action. This allows to reliably prevent the locking element from being extended even though the lid and the pan are still too far apart from each other, which would cause the locking element to reach "into empty space".

The controller may, for example, be a central controller of the cooking appliance, which controls a plurality of components of the cooking appliance, or it may be integrated in the lid or the pan, in particular wherein it only controls the function of the locking element.

An optimum placement of the locking elements will be discussed below. The lid is swivel-mounted in relation to the pan via a swivel axis. This swivel axis is provided on the rear edge of the lid. The pan has two opposite corner portions at the front area remote from the swivel axis, one respective locking element being provided in each of these front corner portions. This locks the cooking chamber in an optimum manner because the lid is mechanically firmly placed at the cooking appliance at the rear edge via the swivel axis and the pan is placed at the cooking appliance by means of defined, possibly adjustable support points, and, at the opposite front edge, the locking elements act to hold the lid to the pan, which itself is mechanically securely placed at the cooking appliance by its swivel axis here.

If at least two locking elements are provided, they may be drivingly coupled by means of a mechanism and may be moved by a shared drive. The above-mentioned mechanism may, for example, be a linkage which extends transversely to the front of the pan or the lid. This linkage may also constitute the above-mentioned guide means or be firmly coupled thereto. By coupling the locking elements by means of the mechanism, a simultaneous, synchronous adjustment or synchronized movement of the locking elements can be achieved.

The lid has a peripheral seal which in the closed state of the pan presses against a contact surface on the top side in order to seal the cooking chamber. The contact surface is that portion of the top side that comes into contact with this seal. The at least one locking element is preferably located laterally outside the contact surface, on the side facing away from the cooking chamber, and is therefore outside the cooking chamber (pressure cooking chamber) when the latter is bounded by the seal. This also results in that no liquid or steam can enter the interior of the pan or into the lid via the locking element.

When the cooking chamber is in its open state, i.e. with the lid swung up, the locking element is preferably housed completely in the lid or in the pan, depending on whether it is integrated in the lid or in the pan; only its front face may be visible when it closes the receiving opening. The drive and the associated mechanism are also completely integrated in the pan or the lid and are therefore not visible from outside.

BRIEF DESCRIPTION OF THE DRAWINGS

Further features and advantages of the invention will be apparent from the description below and also from the accompanying drawings, to which reference is made and in which.

DETAILED DESCRIPTION

Figure 1:
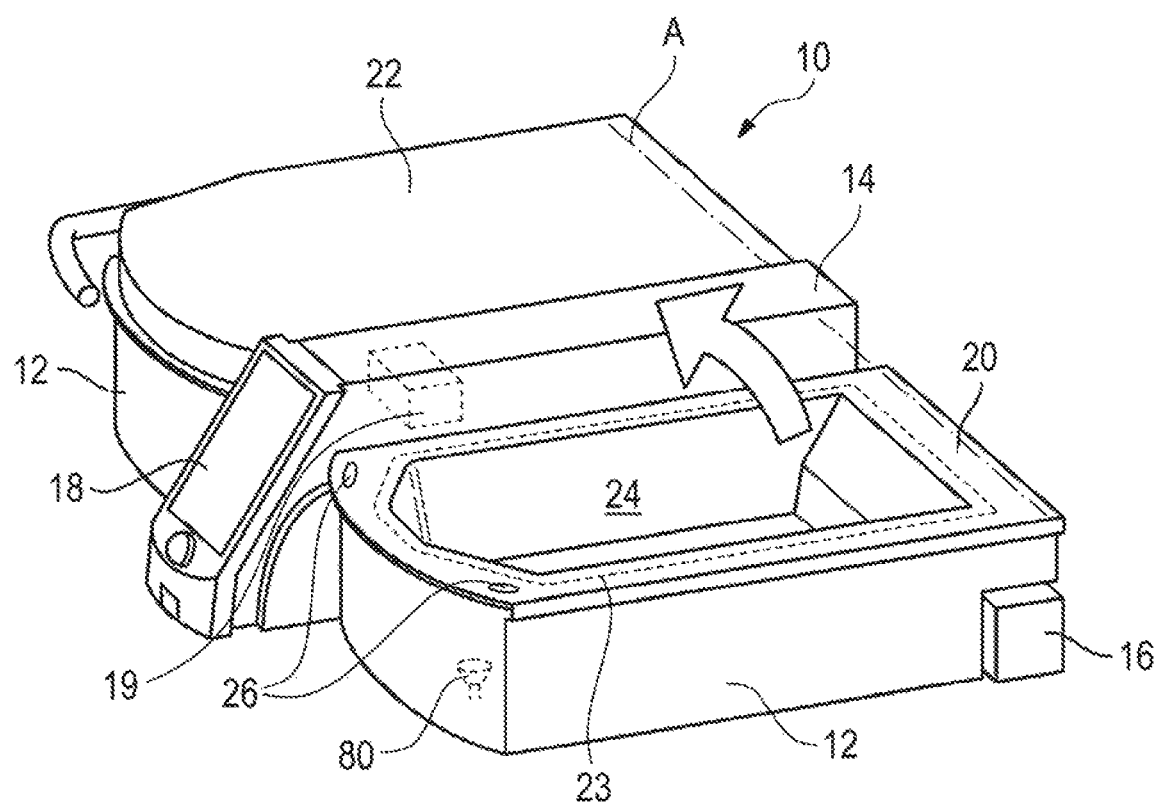
FIG. 1 shows a perspective view of one variant of the cooking appliance according to the invention, with a pan with the lid omitted.

FIG. 1 illustrates a cooking appliance which can be in the form of a tabletop cooking appliance or a cooking appliance with a base frame, the base frame not being illustrated in FIG. 1.

In the variant shown, the cooking appliance 10 optionally comprises two tiltable pans 12, each of which can be separately swiveled about a pan axis. This is symbolized by means of an arrow on the right-hand pan 12.

Tilting the pan forward allows the contents of the pan to be emptied.

The present invention is not limited to a cooking appliance 10 having two pans 12, but rather, only one pan 12 may be provided.

The frame may include a center bar 14 and a rear frame wall 16 as well as side walls (not shown). A touchscreen 18 is used to operate the cooking appliance.

An appropriate controller 19 is accommodated in an installation compartment in the frame, for example in a side wall or in the center bar 14.

The pan 12 has a top side 20, which is preferably flat or flat in sections, the flat section being contacted by an associated swivel-mounted lid 22, more precisely a seal in the lid. Broken lines in FIG. 1 symbolize a contact surface 23, where the continuously surrounding seal provided on a lower side of the lid 22 will rest when the lid 22 is in the lowered state.

The interior of the pan forms a cooking chamber 24, which is tightly sealed when the lid 22 is in the lowered position, to allow pressure cooking.

The bottom of the pan is heated. The appropriate heating may be an electric or a gas-powered heating or a heating supplied with other sources of energy.

The lid 22 can be swiveled either by a motor or manually, more specifically about a swivel axis A.

In order to lock the lid 22 to the pan 12 remote from the swivel axis A when the pan 12 is in the closed position, two locking elements 26, which are movable by motor, are provided for each pan 12 in the embodiment shown. These locking elements 26, of which only the respective top side is illustrated in FIG. 1, are provided laterally outside the contact surface 23, i.e. on the side facing away from the cooking chamber 24.

Furthermore, the locking elements 26 are located in lateral edge regions, i.e. in corner regions of the pan 12.

Figure 2:
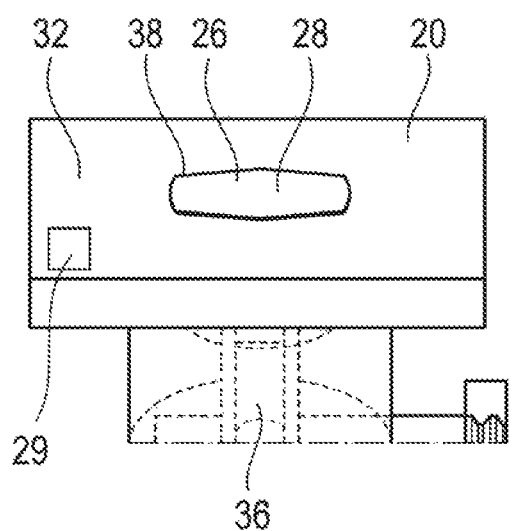
FIG. 2 shows a perspective top view of a portion of the top side of the pan, with the locking element in the lowered position.

FIG. 2 shows a section of the top side 20 of the pan.

At the top side 20 or near the top side 20 a sensor 29 of a first sensor device 27 (see FIG. 6) is arranged, which is intended to detect the distance between the lid 22 and the pan 12.

The sensor 29 is a Reed sensor, for example.

In the position shown in FIG. 1 and in FIG. 2, the flat or slightly angled upper side 28 of the respective locking element 26 is flush with the top side 20 at the edge and does not protrude relative to the top side 20.

Figure 3:
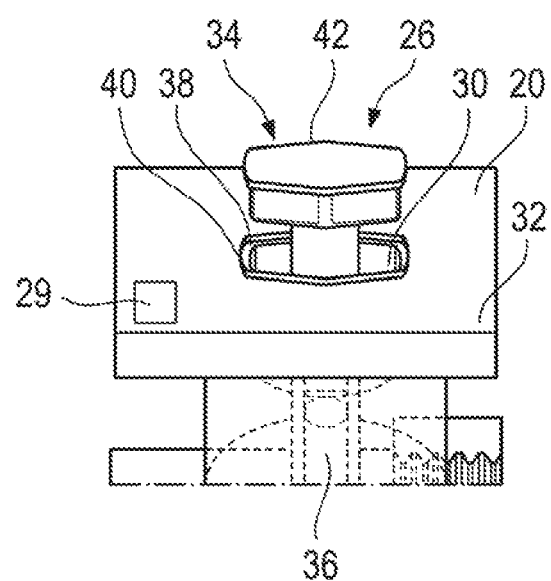
FIG. 3 shows a perspective top view of the portion of the top side of the pan of FIG. 2, with the locking element in the raised position.

As can be seen in FIG. 3, the locking element 26 can be axially moved out by motor upwards over the top side 20 so that it emerges from its receiving opening 30 in the pan front wall 32.

The locking element 26 has a T-shaped head 34, the central web of the "T" being extended and integrally transitioning into a rod 36, which is coupled to the drive mechanism for the locking element 26.

Extending around the upper edge of the receiving opening 30 is a ring seal 38, which may be made from a heat-resistant, food-grade plastic and which closes a gap between the opening edge 40 defining the receiving opening 30 and a peripheral edge 42 at the upper side 28 of the locking element 26 when the locking element 26 is in the retracted position shown in FIG. 2.

As illustrated in FIG. 3, the locking element 26 can be extended upwards and mechanically locked in the lid 22 when the latter is in the lowered position.

Figure 4:
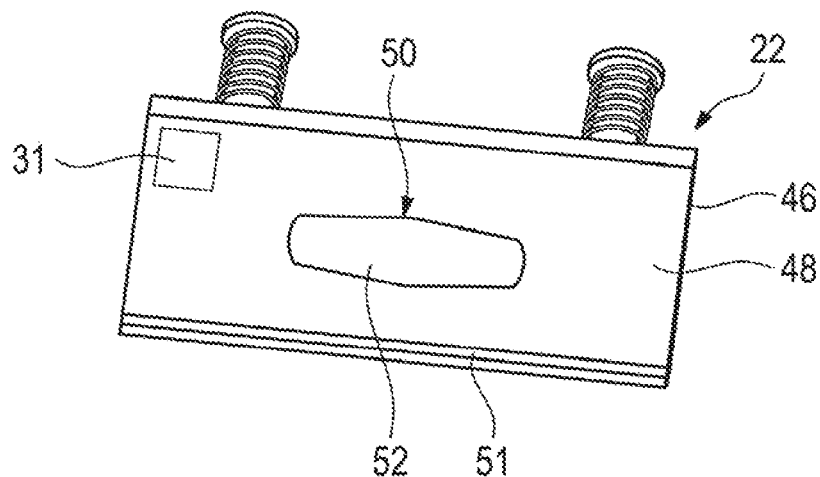
FIG. 4 shows a perspective bottom view of a portion of the lower side of the lid, with the passage opening closed.

To this end, the lid 22 has a lower front wall 46 (see FIG. 4) with a lower side 48 which is preferably completely flat and which can have the previously already mentioned surrounding seal 51 fitted to it.

The seal 51 may, however, also be dispensed with if a minimum gap between the lid and the pan is implemented, e.g. smaller than 0.2 mm.

A release 31 of the first sensor device 27 is arranged at the lower side 48 or near the lower side 48.

The release 31 is a permanent magnet, for example.

For each locking element 26, the front wall 46 has a passage opening 50, the shape of which corresponds to the outer contour of the head of the locking element 26, so that only a small gap is produced between the locking element 26 passing through and the edge of the passage opening 50.

However, when the lid 22 is not locked, the lower side 48 is closed, because each of the passage openings 50 is closed by means of a spring-loaded cover 52.

Figure 5:
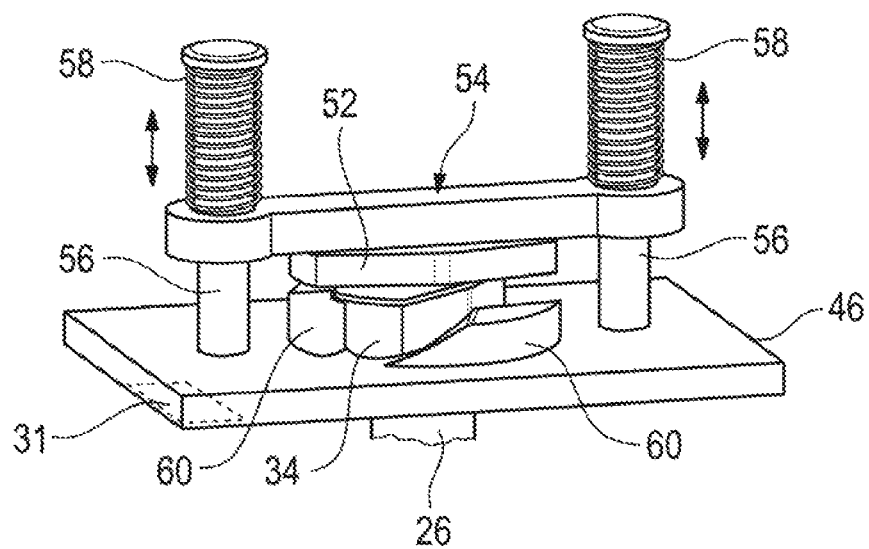
FIG. 5 shows a schematic sectional view of part of the lid with the locking element having penetrated into the lid, prior to reaching the locking position.

FIG. 5 shows that the cover 52 is attached to or continues into a holder 54 in the interior of the lid 22, for example.

For example, the holder 54 is mounted so as to be axially displaceable in the direction of the double arrow by means of one or two guides 56 and is biased downwards by springs 58. Upon application of upward pressure, the cover 52 is pressed into the interior of the lid 22 against the spring force.

FIG. 5 shows a position of the locking element 26 in which the head 34 of the locking element 26 has just dipped into the interior of the lid 22, i.e. through the passage opening 50, and is slightly rotated.

In the variant according to FIG. 5, which should not be understood as limiting, ramps 60 are provided or integrally molded on the top side of the lower front wall 46; when the locking element 26 is rotated, the undersides of the lateral webs of the "T" slide along the ramps and, in the process, are moved axially even further into the interior of the lid 22 by the corresponding ramp surfaces.

An axial pretensioning force is achieved by these ramps 60, which makes sure that the lid 22 is pressed firmly against the top side 20.

Figure 6:
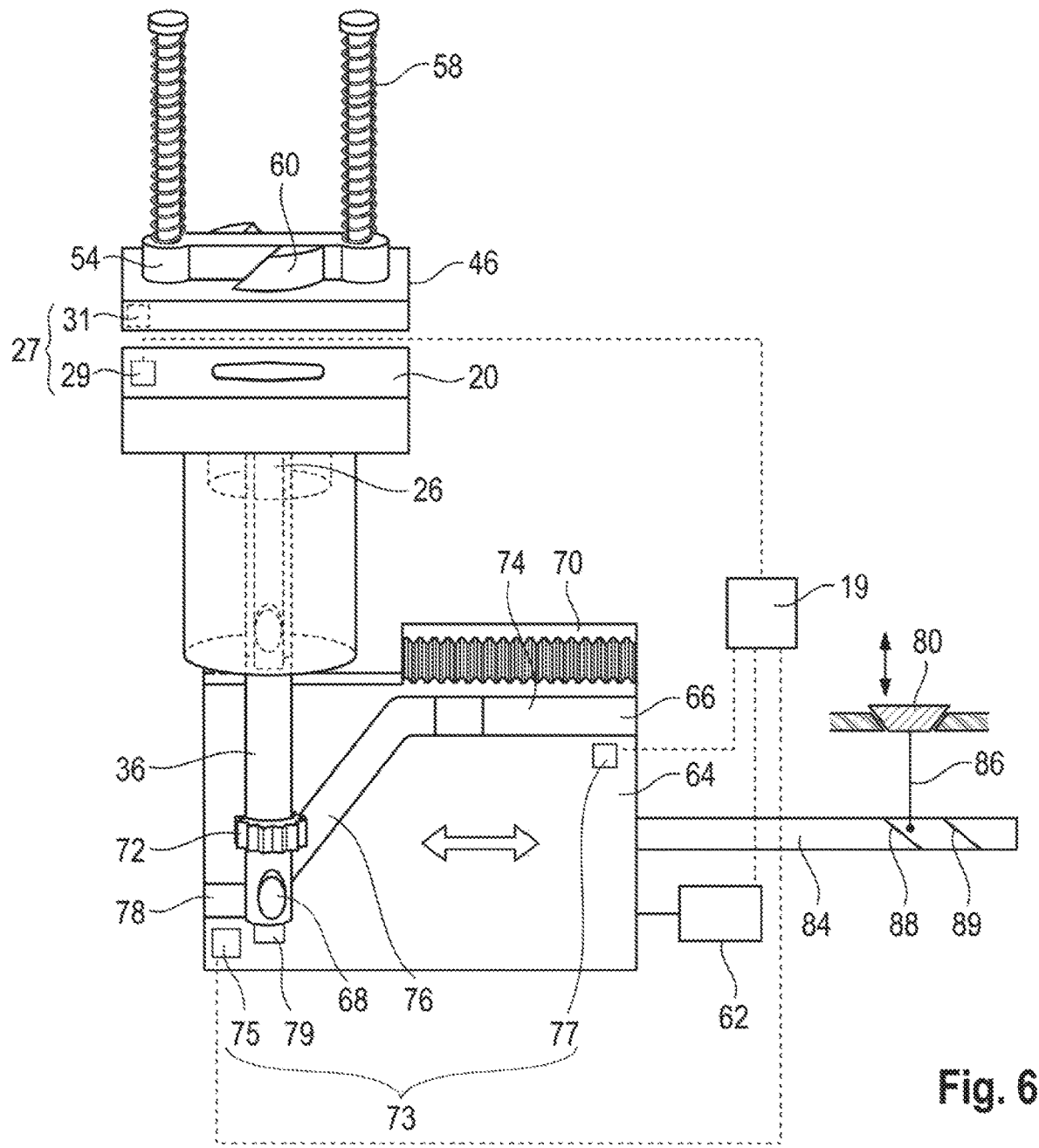
FIG. 6 shows a schematic view of a section taken through part of the pan and the lid, showing the drive and the guide means of the locking element.

FIG. 6 shows the drive mechanism for a locking element 26.

The drive is constituted by an electric motor 62, which moves a gear mechanism or linkage that is mechanically coupled to the rod 36.

In the present embodiment, which should not be understood as limiting, a mechanical guide means 64 is provided here which forms a linkage with the rod 36 and is mechanically coupled to it. In general terms, the rod 36 constitutes a longitudinally adjustable drive member which can be shifted axially upwards by a locking travel.

In the illustrated embodiment, which should not be understood as limiting, the mechanical guide means 64 has a slotted guide 66, into which a lateral projection 68 of the rod 36 protrudes. A pin is fitted through the rod 36 and forms a pair of projections 68 at opposite ends.

In the illustrated embodiment, a toothed rack 70 is additionally provided, which either is part of the mechanical guide means 64 or is fastened thereto.

Above the projection 68, the rod 36 has a toothing 72.

The slotted guide 66 comprises an upper section 74, an oblique section 76 and a lower section 78, which transition into each other.

In addition to the first sensor device 27, a second sensor device 73 is provided, which is arranged in the region of the guide means 64 and is intended to directly detect the position of the locking element 26.

In this embodiment, the second sensor device 73 includes two sensors 75 and 77 and a release 79.

The sensors 75, 77 are for example also Reed sensors, and the release 79 is for example also a permanent magnet.

The sensors 75, 77 are arranged at respective ends of the slotted guide 66.

The release 79 is attached to a lower end of the rod 36.

The controller 19 is in information connection with the sensors 29, 75, 77 and the motor 62. This means that the controller 19 is coupled to the sensors 29, 75, 77 and the motor 62 by means of information technology, for example via lines or wirelessly.

The positioning of the sensor devices 27, 73 and of the respective sensors 29, 75, 77 and releases 31, 79 is only given by way of example.

Different types of sensors or releases may also be used. For example, Hall-effect sensors and magnetic or ferromagnetic releases or mechanical switches can be used as sensors 29, 75, 77 and tappets as the releases 31, 79.

It would also be conceivable that only one sensor device is provided, which can detect the position of the lid 22 in relation to the pan 12 and additionally the position of the locking element 26.

As an alternative to the central controller 19, the sensor devices 27, 73 can each be coupled to their own controller integrated in the lid 22 and/or in the pan 12.

FIGS. 6-9 show successive stages in the locking of the pan 12 with the lid 22.

In the initial position, when the lid 22 rests on the top side 20 of the pan 12, the projection 68 is in the lower section 78.

If the lid 22 is still too wide open, i.e. is too far away from the pan 12, so that the lid 22 cannot be mechanically grasped and locked by the locking element 26, for example because an object (ladle, stirring spatula, or the like) is caught in between, this is detected by the first sensor device 27.

The controller 19 then prevents the motor 62 from being activated and the locking element 26 from being moved out.

If the first sensor device 27 detects that the lid 22 is close enough to the pan 12, i.e. can be grasped by the locking element 26, locking can take place.

Then, if locking is to be effected, the motor 62 is driven by the controller 19 and moves the guide means 64 laterally to the left, so that the projection 68 travels upwards along the oblique section 76, and the locking element 26 moves upwards and enters the passage opening 50 by its head 34 (see FIG. 7), pushing the cover 52 upwards.

In this position, the projection 68 has reached the transition of the oblique section 76 to the upper section 74. When the mechanical guide means 64 is moved even further to the left, the toothing 72 and the toothed rack 70 will mesh with each other so that the locking element 26 is rotated, as illustrated in FIG. 8.

Although the two projections 68 only protrude on opposite sides relative to the rod 36, it cannot occur during this rotation that the locking element 26 falls down, because as soon as the projection 68, which was previously located in the slotted guide 66, moves out of the slotted guide 66, the head 34 is rotated sideways in relation to the passage opening 50 and can no longer fall down through it.

Figure 9:
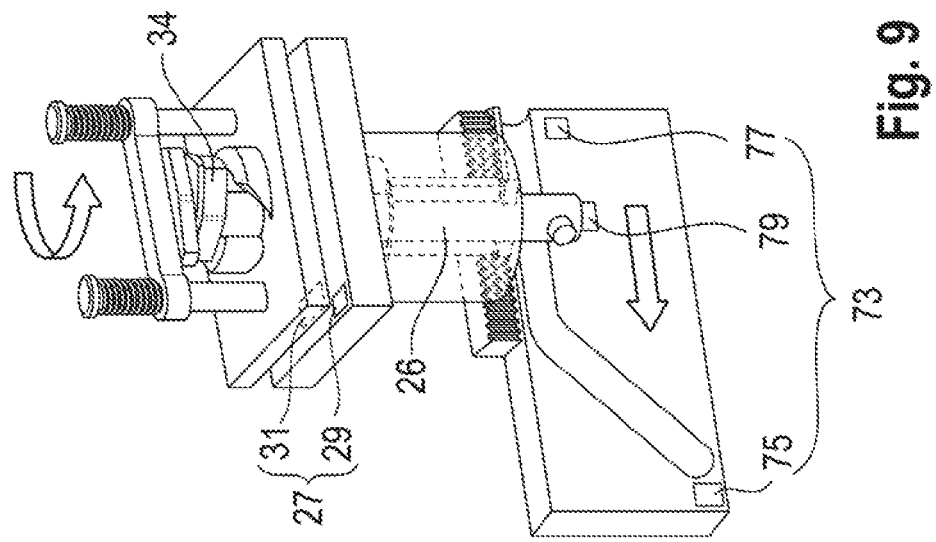
FIG. 9 shows a sectional view corresponding to FIG. 6, with the locking element fully locked.
Figure 8:
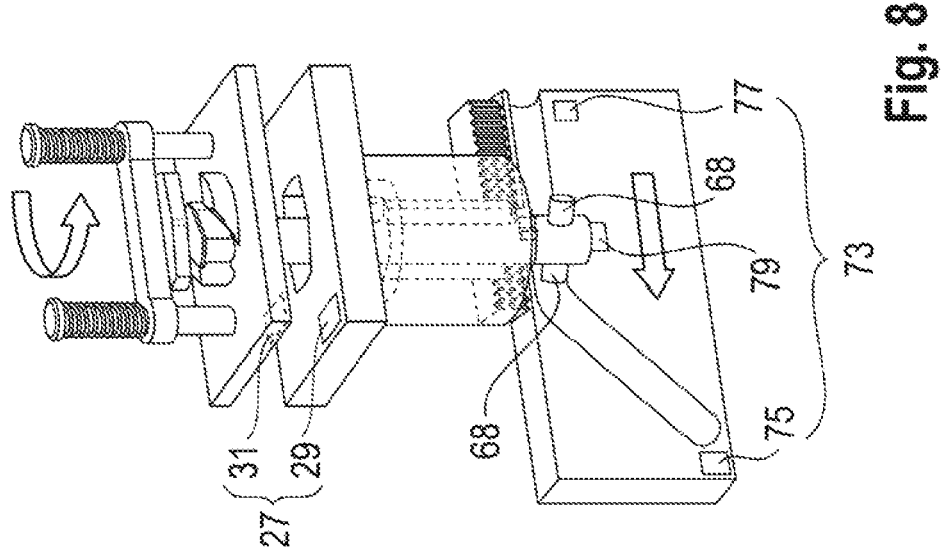
FIG. 8 shows a sectional view corresponding to FIG. 6, with the locking element partly rotated.
Figure 7:
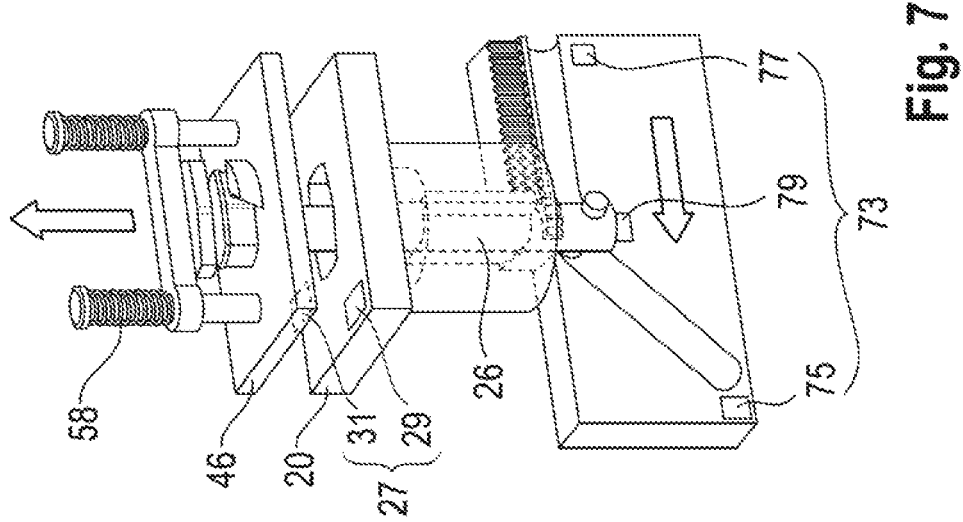
FIG. 7 shows a corresponding sectional view of the cooking appliance according to FIG. 6 with the locking element raised.

As is shown by the comparison between FIGS. 8 and 9, the head 34 of the locking element 26 then travels along the ramp 60, with the other projection 68 having penetrated into the slotted guide 66 in the process, making sure that the locking element 26 is clamped axially. As it moves along the ramps 60, the locking element 26 then ensures that the lid 22 is pressed even further down and the seal 51 is tightly compressed.

As soon as the release 79 of the locking element 26 has reached the final position, the sensor 77 senses the presence of the release 79. This causes the controller 19 to detect that the locking element 26 has been completely extended and rotated.

As a result, the pan 12 and the lid 22 are mechanically locked to each other, which the controller 19 can communicate to the operator acoustically or visually, for example by means of an indication on the touchscreen 18. Using the same drive, an axial movement of the locking element 26 and a swivel movement of the locking element 26 are achieved.

Conversely, the sensor 75 can detect the presence of the release 79 as soon as the locking element 26 with its release 79 has been moved back to the initial position.

The pan 12 and the lid 22 are thus unlocked from each other, which the controller 19 can also communicate to the operator acoustically or visually, for example by means of an indication on the touchscreen 18.

In the embodiment shown, each locking element 26 has two laterally protruding locking extensions constituted by its T-shaped head 34, the locking extension engaging behind the counterpart, here the lid 22. To put it very precisely, the counterpart in the present case is the lower front wall.

In the region of its bottom, more specifically close to the front edge of the bottom, each pan 12 has an outlet valve 80, which is symbolically represented in FIG. 1. This outlet valve 80 is vertically adjustable, more specifically by means of the motor 62.

The mechanical coupling of the drive of the locking element, that is, in the present case the motor 62, to the outlet valve 80 is purely mechanical. The coupling is configured such that the outlet valve 80 can only be opened when the lid 22 is not locked. How this can be done is illustrated symbolically in FIG. 6.

For example, a longitudinally adjustable drive member 84 is provided, which is, for example, coupled to, or part of, the mechanical guide means 64. The longitudinally adjustable drive member 84 is mechanically connected via a coupling member 86, which is attached to the outlet valve 80 on the lower side thereof, to the effect that a lateral movement of the drive member 84 results in a vertical movement of the outlet valve 80. For example, the coupling member 86 is a Bowden cable or a rod or linkage.

From the non-locked position depicted in FIG. 6, the motor 62 is actuated such that the mechanical guide means 64 is shifted to the right; thus, the drive member 84 is also moved and shifted to the right, here for example via a ramp 88, whereby the coupling member 86 is moved and the outlet valve 80 is shifted upwards to the open position.

During locking, on the other hand, a movement to the left is produced, which ensures, again via a ramp 89, that the outlet valve 80 is closed.

Preferably, both locking elements 26 are coupled to the same mechanical guide means 64, so that a mechanical forced movement is involved here when both locking elements 26 are moved.

Figure 10:
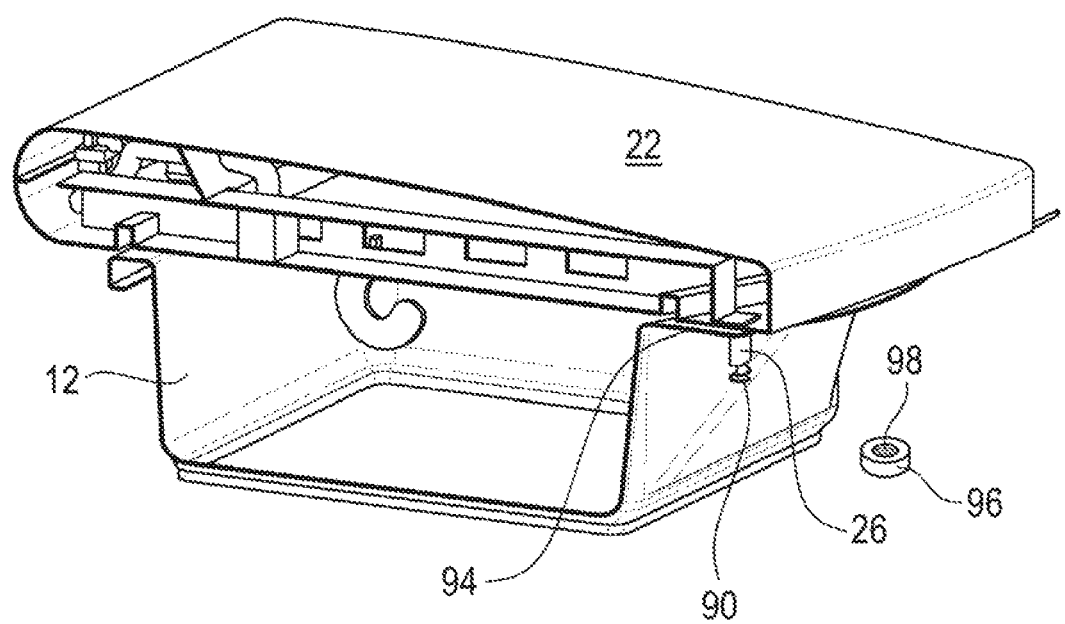
FIG. 10 shows a sectional view of a cooking appliance according to a second embodiment.
Figure 11:
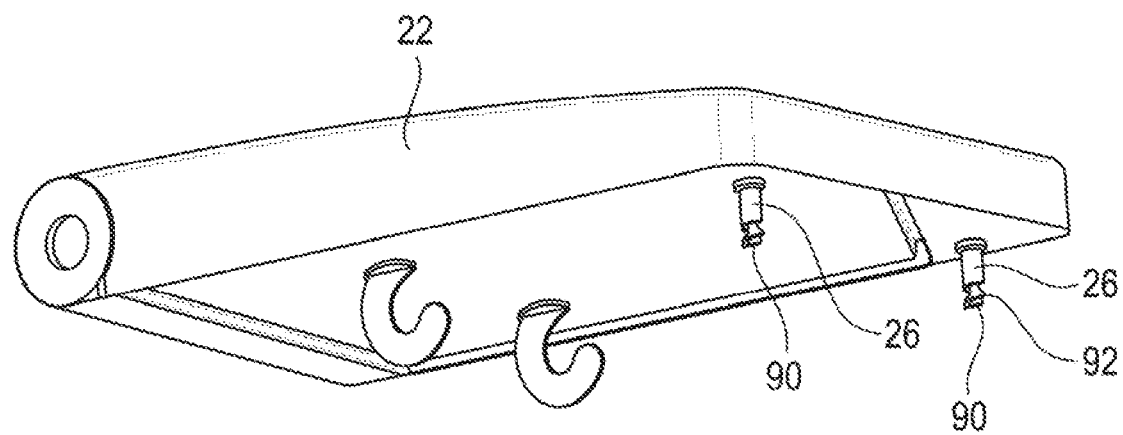
FIG. 11 shows a perspective bottom view of the lid of the cooking appliance as shown in FIG. 10.

In the embodiment shown so far, the locking element 26 is integrated in the pan. As an alternative, however, locking elements 26 integrated in the lid may also be provided, as illustrated in FIGS. 10 and 11.

The special feature here is that these locking elements 26 have bayonet-shaped lower ends 90, with adjoining threaded sections 92.

In this embodiment, the appropriate drive for the movement of each locking element (here too, a central drive is provided for both locking elements 26) is located in the lid 22.

The locking elements 26 dip into respective passage openings which are provided through a movable cover on the top side 20 of the pan 12 and which can be in the position of the previously mentioned receiving openings 30.

Inside the pan 12, i.e. below the pan front wall 94 (see FIG. 10), the pan 12 has a counterpart 96, which is depicted separately in FIG. 10. The counterpart 96 has a central opening 98, into which the bayonet-shaped end 90 can penetrate, and an internal thread.

Then, the locking element 26 is rotated so that the locking element 26 moves axially through the threaded section 92 like a bolt that threads into a nut. This produces an axial force that corresponds to the force exerted by the ramps 60 and results in a compression of the seal 51.

The concepts for coupling the movement of the outlet valve 80 may, of course, also be implemented for this embodiment; here, for example, only a mechanical coupling between the lid 22 and its drive and the pan 12 and the outlet valve 80 is to be achieved.

While in the embodiment illustrated in FIG. 10 the locking elements 26 permanently project from the lower side of the lid 22, an additional axial movement component could also ensure an axial retraction of each locking element 26 into the interior of the lid 22 here as well.

The invention claimed is:

1. A cooking appliance comprising at least one pan and a movable lid closing a cooking chamber in the pan, wherein the lid is movable to the pan by a swivel movement, only, and being swivel-mounted in relation to the pan via a swivel axis which is provided on a rear edge of the cooking appliance so that the lid is mechanically firmly placed at the cooking appliance at the rear edge via the swivel axis, the pan having a top side against which a lower side of the lid is configured to sealingly rest when the cooking appliance is in a closed state, and comprising an electric motor wherein at least one locking element is provided which is movable by the electric motor and is either integrated in the pan or integrated in the lid and which, when in a locking position, with the pan in a closed state, is configured to extend from a top side and vertically upwards relative to the top side, mechanically locking the lid and the pan to each other to block a swivel movement of the lid for opening the cooking appliance.

2. The cooking appliance according to claim 1, wherein the locking element when integrated in the pan, when in the locking position, is configured to extend into the lid, or wherein when the locking element when integrated in the lid, when in the locking position, is configured to extend into the pan.

3. The cooking appliance according to claim 1, wherein the locking element is configured to execute an axial movement in order to penetrate into the lid for locking in the case of the locking element integrated in the pan and to penetrate into the pan in the case of the locking element integrated in the lid.

4. The cooking appliance according to claim 1, wherein the at least one locking element that is either integrated in the pan or integrated in the lid is configured to execute a swivel movement in order to engage behind a counterpart on the lid in the case of the locking element integrated in the pan or a counterpart on the pan in the case of the locking element integrated in the lid.

5. The cooking appliance according to claim 4, wherein the at least one locking element that is either integrated in the pan or integrated in the lid has at least one laterally projecting locking extension by which the locking element engages behind the counterpart.

6. The cooking appliance according to claim 4, wherein the counterpart is a lid wall facing the top side, or the pan front wall.

7. A cooking appliance comprising at least one pan and a movable lid closing a cooking chamber in the pan, the pan having a top side against which a lower side of the lid is configured to sealingly rest when the cooking appliance is in a closed state, wherein at least one locking element and a motor for driving the locking element are provided, the locking element being either integrated in the pan or integrated in the lid and which, when in a locking position, with the pan in the closed state, extends from the top side and vertically upwards relative to the top side, mechanically locking the lid and the pan to each other to prevent a swivel movement for opening, wherein when the locking element is integrated in the pan, the lid has, on a lid wall facing the top side, at least one passage opening through which the associated locking element is configured to penetrate into an interior of the lid and to grasp the lid in its interior during locking, and when the locking element is integrated in the lid, the pan has, on its top side, at least one passage opening through which the associated locking element penetrates into an interior of the pan and grasps the pan in its interior during locking wherein no parts of the locking element protrude outwards from a unit defined by the pan and the lid when the lid closes the pan.

8. The cooking appliance according to claim 7, wherein a spring-loaded cover for the at least one passage opening is provided, which spring-loaded cover is configured to be displaced by the associated locking element penetrating into the passage opening wherein when the cooking appliance is open, the cover is flush with a lower side of the lid in the case of the locking element integrated in the pan and flush with the top side of the pan in the case of the locking element integrated in the lid.

9. The cooking appliance according to claim 1, wherein the locking element has a T-shaped head which lockingly engages the lid or the pan.

10. A cooking appliance comprising at least one pan and a movable lid closing a cooking chamber in the pan, the pan having a top side against which a lower side of the lid is configured to sealingly rest when the cooking appliance is in a closed state, wherein at least one locking element is provided which is movable by a motor and is either integrated in the pan and which, when in a locking position, with the pan in the closed state, extends from the top side and vertically upwards relative to the top side, mechanically locking the lid and the pan to each other to prevent opening the at least one locking element, when in a retracted condition, is flush with the top side of the pan, or integrated in the lid and which, when in a locking position, with the pan in the closed state, extends from the top side and vertically upwards relative to the top side, mechanically locking the lid and the pan to each other to prevent opening, wherein the at least one locking element is flush with the lower side of the lid and is configured to close a receiving opening on the lower side of the lid.

11. The cooking appliance according to claim 10, wherein between an opening edge defining the receiving opening and a peripheral edge of the locking element in the retracted condition, a seal closes a gap between the opening edge and the peripheral edge.

12. The cooking appliance according to claim 1, wherein a drive for actuating the at least one locking element is coupled to a mechanical guide, from the movement of which a vertical adjustment and additionally a rotation of the at least one locking element is derived by the drive.

13. The cooking appliance according to claim 12, wherein the pan includes an outlet valve near a bottom for emptying the pan, the outlet valve being mechanically coupled to the drive of the at least one locking element integrated in the pan, so that the drive also actuates the outlet valve.

14. The cooking appliance according to claim 13, wherein a mechanical coupling of the drive to the outlet valve is configured such that the outlet valve can only be opened when the lid is in an unlocked state.

15. The cooking appliance according to claim 14, wherein coupled to the drive is a longitudinally adjustable drive member which in a locking travel shifts the at least one locking element, with the outlet valve only being actuated by a distance traveled that exceeds the locking travel.

16. The cooking appliance according to claim 12, wherein at least one sensor device is provided which is configured to detect a position of the lid relative to the pan and/or a position of the locking element, and a controller is provided which is coupled to the sensor device and the drive by way of information technology, the controller being adapted to actuate the drive for shifting the at least one locking element only when the sensor device has detected that the lid, in the case of a locking element integrated in the pan, or the pan, in the case of the locking element integrated in the lid, is configured to be grasped and locked by the locking element.

17. The cooking appliance according to claim 1, wherein a respective locking element is provided at a front corner portion of the pan remote from the swivel axis.

18. The cooking appliance according to claim 1, wherein at least two locking elements are provided which are drivingly coupled by a coupling mechanism and are moved by a shared drive.

19. The cooking appliance according to claim 18, wherein the coupling mechanism includes a linkage which extends transversely to a front of the pan or a front of the lid.

20. The cooking appliance according to claim 1, wherein the lid has a peripheral seal which in the closed state of the pan presses against a contact surface on the top side in order to seal the cooking chamber, the at least one locking element being located laterally outside the contact surface on the side facing away from the cooking chamber.

* * * * *